(12) United States Patent
Hansen et al.

(10) Patent No.: US 6,968,887 B2
(45) Date of Patent: Nov. 29, 2005

(54) WINDOW SHADE WITH A RATTLE-FREE GUIDANCE SYSTEM

(75) Inventors: Melf Hansen, Baltmannsweiler (DE); Matthias Maier, Esslingen (DE)

(73) Assignee: BOS GmbH & Co. KG, Ostifildern (DE)

( * ) Notice: Subject to any disclaimer, the term of this patent is extended or adjusted under 35 U.S.C. 154(b) by 0 days.

(21) Appl. No.: 10/602,274

(22) Filed: Jun. 24, 2003

(65) Prior Publication Data

US 2004/0069425 A1    Apr. 15, 2004

(30) Foreign Application Priority Data

Jun. 24, 2002   (DE) ................................ 102 28 027

(51) Int. Cl.[7] ................................................ B60J 3/00
(52) U.S. Cl. .................... 160/370.22; 160/280; 160/41
(58) Field of Search ........................... 160/370.22, 280, 160/274, 273.1, 271, 41; 296/97.8, 97.7, 296/37.16

(56) References Cited

U.S. PATENT DOCUMENTS

| | | |
|---|---|---|
| 1,741,609 A | 12/1929 | Brooks |
| 1,904,968 A | 4/1933 | Bredin |
| 2,491,765 A | 12/1949 | Rambo |
| 3,489,200 A * | 1/1970 | Recchione ................. 160/133 |
| 4,357,978 A * | 11/1982 | Keller et al. .................. 160/41 |
| 4,467,853 A * | 8/1984 | Downey, Jr. ................. 160/133 |
| 4,758,041 A * | 7/1988 | Labeur ........................ 296/152 |
| 4,792,178 A | 12/1988 | Kokx |
| 5,201,810 A * | 4/1993 | Ojima et al. ................ 160/265 |
| 5,404,926 A * | 4/1995 | Ojima et al. ................ 160/280 |
| 5,482,104 A * | 1/1996 | Lichy ....................... 160/273.1 |
| 6,086,133 A * | 7/2000 | Alonso ....................... 296/97.8 |
| 6,095,231 A * | 8/2000 | Hahn .................... 160/370.22 |
| 6,179,373 B1 | 1/2001 | Bohm et al. |
| 6,547,307 B2 * | 4/2003 | Schlecht et al. ........... 296/97.4 |
| 6,598,929 B2 * | 7/2003 | Schlecht et al. ........... 296/97.4 |
| 6,695,381 B2 * | 2/2004 | Schlecht et al. ........... 296/97.4 |
| 6,739,375 B2 * | 5/2004 | Schlecht et al. ....... 160/370.22 |
| 2002/0059989 A1 | 5/2002 | Schlecht |

FOREIGN PATENT DOCUMENTS

| | | |
|---|---|---|
| DE | 1 905 163 U | 11/1964 |
| DE | 3413966 A1 | 10/1985 |
| DE | 197 39 919 A1 | 3/1999 |
| DE | 198 03 129 A1 | 8/1999 |
| DE | 100 57 759 A1 | 6/2002 |
| EP | 1215063 A1 | 6/2002 |
| FR | 902518 | 9/1945 |

* cited by examiner

Primary Examiner—David Purol
(74) Attorney, Agent, or Firm—Leydig, Voit & Mayer, Ltd.

(57) ABSTRACT

In connection with a rear window shade, elastomeric profiled strips are assigned to the guide rails in which the pull rod is guided. The profiled strips are capable of holding the respective end of the pull rod in the guide rail in a substantially rattle-free manner.

19 Claims, 4 Drawing Sheets

WINDOW SHADE WITH A RATTLE-FREE GUIDANCE SYSTEM

FIELD OF THE INVENTION

The present invention relates generally to window shades for motor vehicles.

BACKGROUND OF THE INVENTION

Rear window shades for motor vehicles are known in the prior art. Today, a rotatably seated winding shaft installed under the rear window ledge is usually a part of these shades. An edge of the shade web is fastened to the winding shaft and can be pulled out through a slit in the rear window ledge. Since the shade web is not rigid in itself, it is necessary for the shade web to be guided. To this end, guide rails, in which a pull rod arrangement is guided, extend at the sides of the side to be shaded. The pull rod arrangement is fastened to the front edge of the shade web, i.e. to that edge which travels the greatest distance when the window shade is extended and retracted.

The guide rails have an approximately C-shaped cross section, so that an undercut channel is created, which opens to the outside via a slit. The slits of the two guide rails face each other. The pull rod arrangement can include guide bodies that can be guided in the guide rails in such a way that the guide bodies cannot be pulled out at right angles to the longitudinal axis of the guide rail.

Although as a rule the guide bodies are pre-tensed by springs, and a spring motor force also acts on the pull rod arrangement which attempts to wind the shade web up on the winding shaft, such arrangements are not completely free of rattles. Force components, which are effective perpendicularly with respect to the plane defined by the extended window shade, are primarily only absorbed by the frictional connection which is used between the guide bodies and the actuating devices for transporting the pull rod arrangement along the guide rails. The forces can easily become larger, and the guide bodies can rattle in the transverse direction. The question as to whether this noise will develop depends on the position of the window shades, the installed position, the jarring being generated because of road conditions, and other factors.

Freedom from rattling cannot be completely assured by means of the previous solutions.

SUMMARY OF THE INVENTION

In view of the foregoing, an object of the invention is to produce a window shade for motor vehicles in which the pull rod arrangement can be guided in the guide rails without rattling.

As in the prior art, the pull rod arrangement of the novel window shade of the present invention is guided in one or two guide rails. The pull rod arrangement is moved along the guide rails with the aid of a transporting or actuating device.

To assure freedom from rattles, at least one elastic lip, which is elastically deformed by the pull rod arrangement, extends in the direction of the guide rail. The pull rod arrangement is pressed elastically and resiliently against an appropriate wall of the guide rail with the aid of the lip and with a comparatively large force. Because of this arrangement, vibrations in the vehicle cannot trigger rattling noises between the guide rail and the pull rod arrangement.

Moreover, the arrangement has the advantage that it covers the guide rail to a large extent. It is no longer necessary to design the guide rail in a color corresponding to the color of the interior trim of the vehicle. It is sufficient if the color of the lip corresponds to the interior trim color, while the guide rail is a simple extruded profiled section, preferably made of aluminum.

So that the lip remains directly on the guide rail and cannot be pushed away by the elastic deformation, positive connecting mechanisms are preferably provided for connecting the lip with the guide rail. Positive connecting mechanisms are preferred over a material-to-material connection, because they are simpler to install and are permanent in every case.

The positively acting holding or connecting mechanism can comprise an undercut groove or a strip which, in cross section, is L- or Z-shaped. The lip has a corresponding fastening device.

The guide rail is preferably provided with a continuous flange strip for fastening the guide rail easily to the body. The guide rail can also have a flange strip on which a portion of the side trim can be fastened.

Where only a single lip is used, it is necessary to greatly deform the lip at the point where the pull rod arrangement is located, if the covering effect of the shiny portions of the guide rail is desired in addition to rattle prevention.

If a large deformation is not desired, it is practical to use two lips in place of a single lip, wherein the joint between the two lips follows the course of the slit.

The window shade in accordance with the invention can also be used in connection with windows wherein the width of the window changes along the path of the shade web. To this end, the length of the pull rod arrangement can be changed in a telescope-like manner. Changeability can be achieved if guide elements are provided which can be adjusted by means of a center piece. The cross section of the guide bodies is matched to the cross section of the channel in the guide rail.

Further developments are moreover the subject of dependent claims. In this connection, combinations of characteristics should also be considered to be claimed, which are not addressed by a specific exemplary embodiment.

An exemplary embodiment of the subject of the invention is represented in the drawings.

BRIEF DESCRIPTION OF THE DRAWINGS

In a schematic representation, FIG. 1 shows a rear view of a passenger car 1 with a roof 2, a trunk 3, as well as two C-pillars 4 and 5. A rear window opening 6 is located between the two C-pillars 4 and 5, which is bordered at the top by the rear roof edge 7 and on the bottom by the window ledge 8. A rear window glass 9 is seated in the rear window opening, glued in by means of window rubber strips, for example, in a known manner.

Figure 1:
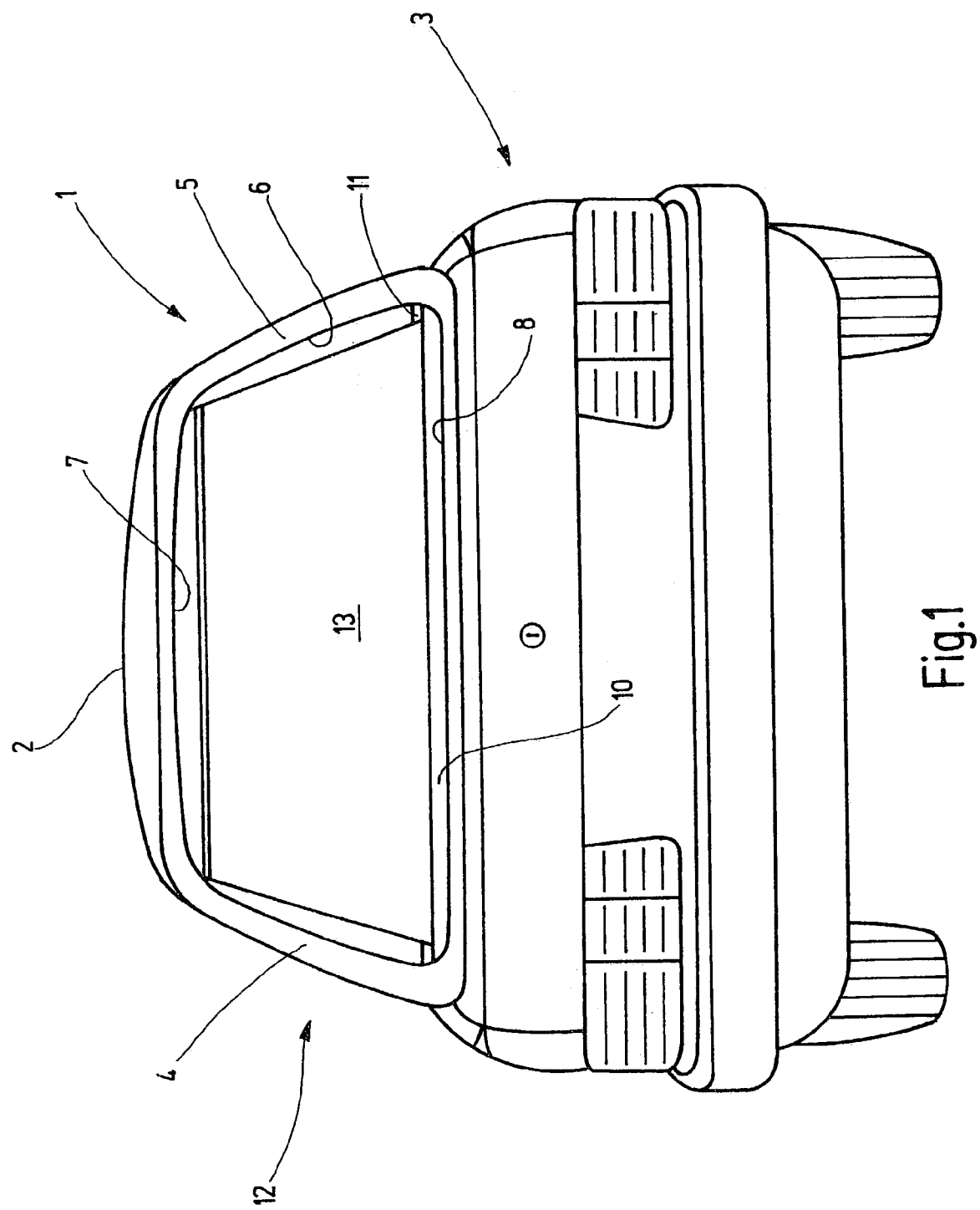
FIG. 1 is a rear view of a motor vehicle equipped with a rear window shade according to the invention.

A shelf 10, extending horizontally between the lower window edge 8 and the rear seat back, not visible in the drawing, is located in the interior of the passenger car in front of the inside of the rear window glass 9. A straight outlet slit 11 extends in the shelf 10.

Figure 2:
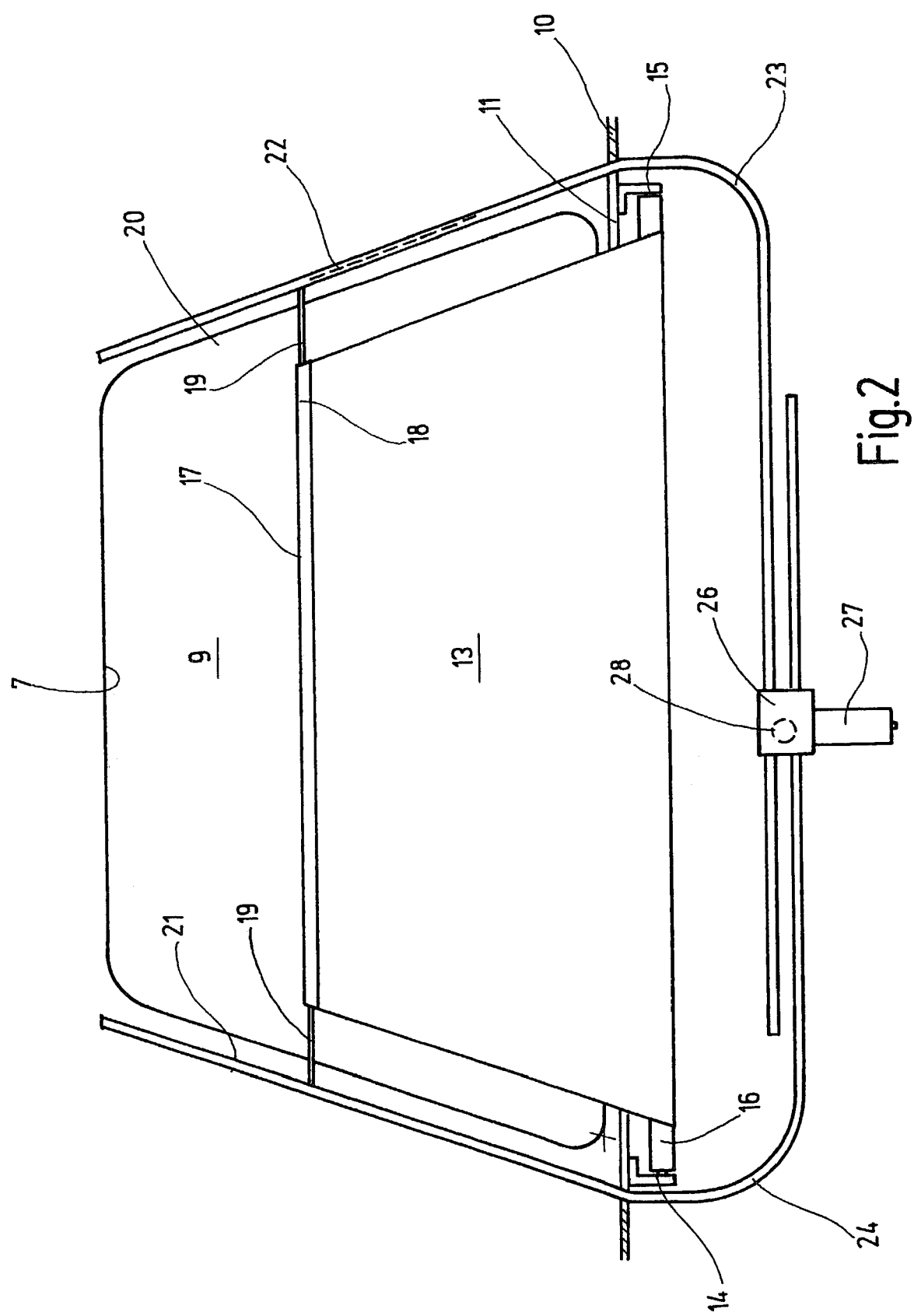
FIG. 2 is a front view of the rear window shade of FIG. 1.

The outlet slit 11 is part of a rear window shade 12, whose basic structure is represented in a greatly schematized way in FIG. 2.

The rear window shade 12 has a shade web 13, which is shown in the extended state in FIG. 1. It has a trapezoidal shape in order to shade the rear window, whose entire shape is trapezoidal.

As shown in FIG. 2, a winding shaft 16 is rotatably seated underneath the shelf 10 with the aid of two angled brackets 14 and 15. One edge of the shade web 13 is fastened on the winding shaft 16. The other edge which is remote from the winding shaft 16, is connected to a pull rod arrangement 17.

The winding shaft 16 is pre-tensed in the direction of winding the shade web 13 by means of a spring motor, not visible, arranged inside the winding shaft 16.

Two guide elements 19 of the pull rod arrangement 17, which can be substantially displaced in a telescope-like manner, can be seen in FIG. 2. The telescope-like displaceable guide elements 19 run in two guide rails 20 and 21, which extend inside of the vehicle on the other side of the lateral edges of the window 6, so that they cannot be seen from the outside.

Thrust members, indicated in dashed lines at 22, extend inside the two guide rails 20, 21. The guide rails 20 and 21 are continued below the shelf as guide tubes 23 and 24, through which the guide rails 21 and 20 are connected with a gear 26 of a gear motor 27. The thrust members 22 extend through the guide rails 20, or 21, as well as the connecting tubes 23 and 24.

The thrust members 22 are linear flexible elements similar to Bowden cables, which are provided with a helically extending rib on the outside. With the aid of the ribs, the thrust members 22 mesh with an output gear wheel 28, indicated in dashed lines. The free ends of the thrust members, which are 22 located inside the guide rails 20 and 21, cooperate with the guide elements 19.

Figure 3:
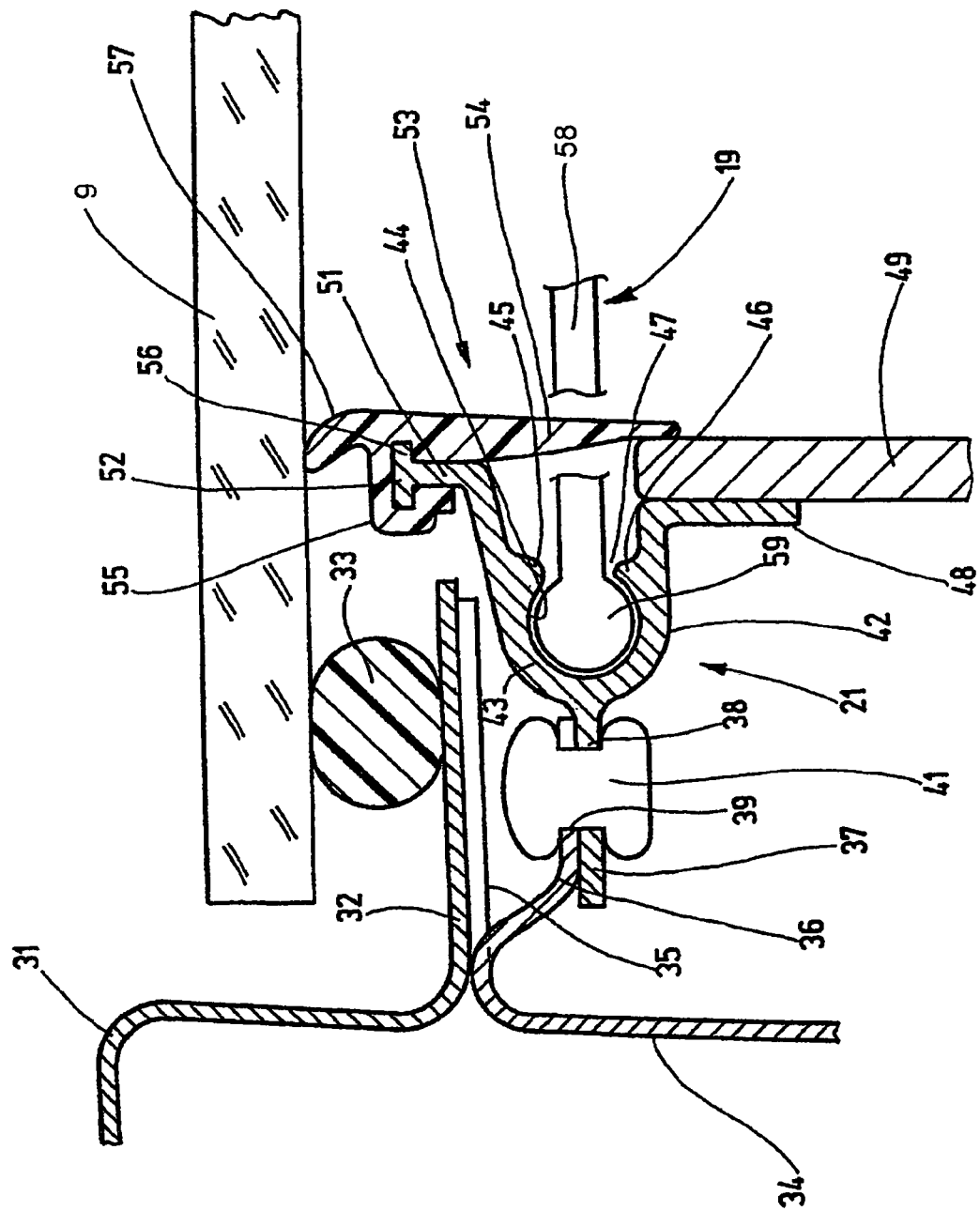
FIG. 3 is an enlarged partial section view of the rear window shade of FIG. 1 taken along a plane perpendicular to the longitudinal axis of the guide rail showing a single lip.

FIG. 3 provides a detailed view, which shows the structure and design of the guide rail 21, including the surrounding parts of the vehicle body. The structure of the guide rail 20, as well as its installation in the vehicle body, is identical, so that the explanation with respect to the guide rail 21 will suffice for both.

A portion of an outer shell 31 of a vehicle body is visible in FIG. 3 that forms a flange at 32 on which the window glass 9 is glued by means of an elastomeric material 33. The partial view in FIG. 3 furthermore shows a portion of the inner shell 34 of the vehicle body that is also provided with a flange 35, which is connected with the flange 32, for example, by spot welding.

Several tongues or clips 36 are notched out of the flange 35 and pushed up at substantially equidistant spacings from each other for fastening the guide rail 21.

The guide rail 21 is an extruded profiled aluminum section, on which a flange 37 is formed and extends over the length of the guide rail 21. The flange 37 lies flat on the tongues 36. The flange 37 contains a bore 38 that is located at the height of each of the tongues 36 and is aligned with a bore 39 in the clip 36. A blind rivet 41 extends through the bores by means of which the flange 37 is positively connected with the clip 36. In this way, the guide rail 21 is connected with the vehicle body at several fastening points along a lateral edge of the rear window 9.

Starting at the flange 37, the profile of the guide rail 21 forms two legs 42 and 43, which delimit a partially cylindrical guide groove 44 between them. Because of longitudinal strips 45 and 46 being formed, a slit 47 leading to the outside is created, whose clearance is less than the diameter of the interior of the guide groove 44.

Following, the strip 46, the leg 42 makes a transition into a flange 48, which extends approximately perpendicular with respect to the surface of the window glass 9.

The flange 48 is used as a fastening flange for a portion of interior trim 49.

The leg 43 also continues past the guide groove 44 and forms a flange 51, which runs parallel with the flange 48 and terminates in the center of a flange 52. The flanges 51 and 52 constitute a T-shaped profiled section.

The T-shaped profiled section consisting of the flanges 51 and 52 is used for positively holding an elastomeric profiled strip 53, which forms a lip 54 made of an elastomeric material. At its root, the lip 54 makes a transition into a thickened section 55 containing a T-shaped groove 56 that fits positively over the profiled section made by the flanges 51 and 52. A further lip 57 exists adjoining the thickened section 55. The lip 57 rests sealingly against the window glass 9 in order to close off any gap that may exist without crowding occurring between the window glass 9 and the thickened area 55.

The lip 54 (the cross sectional profile of which is visible in FIG. 3) extends over the entire length of the guide rail 21, namely at least from the upper edge 7 of the rear window up to the outlet slit 11. The lip 54 covers the slit 47 of the guide rail 21, and the edge of the lip 54 remote from the window glass 9 rests on the lateral trim 49.

The guide element 19 has an essentially cylindrical shaft 58 that can be displaced in a telescope-like manner arranged in a center piece of the pull rod arrangement 17. On its free end, the cylindrical shaft 58 has a ball-shaped or cylindrical guide body 59 that slidingly moves in the guide groove 44.

Since the lip 54 completely covers the gap between the leg 43 and the edge of the lateral trim 49, the lip 54 is maintained elastically open by the cylindrical shaft 58 at the point where the cylindrical shaft 58 is located. Because of its inherent elasticity, however, the lip 54 again rests on the lateral trim 49, i.e. above and below the shaft 58, in the further course of the guide rail 21. The lip 54 is raised only in the vicinity of the shaft 58. Because of the inherent elasticity of the lip 54, a force is continuously exerted on the shaft 58 and, in the illustrated embodiment, the force tends to push the shaft 58 away from the window glass 9 in the direction toward the oppositely located rim area of the guide groove 44. The pre-tensioning that occurs in the course of this is so great that vibrations in the pull rod arrangement 11 are incapable of lifting the guide body 59 off the wall area against which the guide body 59 is being pressed as a result of the inherent elasticity of the lip 54.

The shade otherwise operates in such a way that the schematically indicated thrust members 22 are pushed forward in the guide rails 20 and 21 when the drive motor 27 is started. The trust members therefore push the guide bodies 59 of the pull rod arrangement 17 ahead of themselves with the guide bodies 59 being steadily pushed against the wall of the guide groove 44 by the lip 54 during their entire travel.

If the motor 27 is put into operation in the opposite direction, the thrust members 22 are retracted out of the guide rails 20 and 21. The pull rod arrangement 17 follows this retrograde movement because of the force which the spring motor seated in the winding shaft 16 transmits to the pull rod arrangement 17 via the shade web 13.

Figure 4:
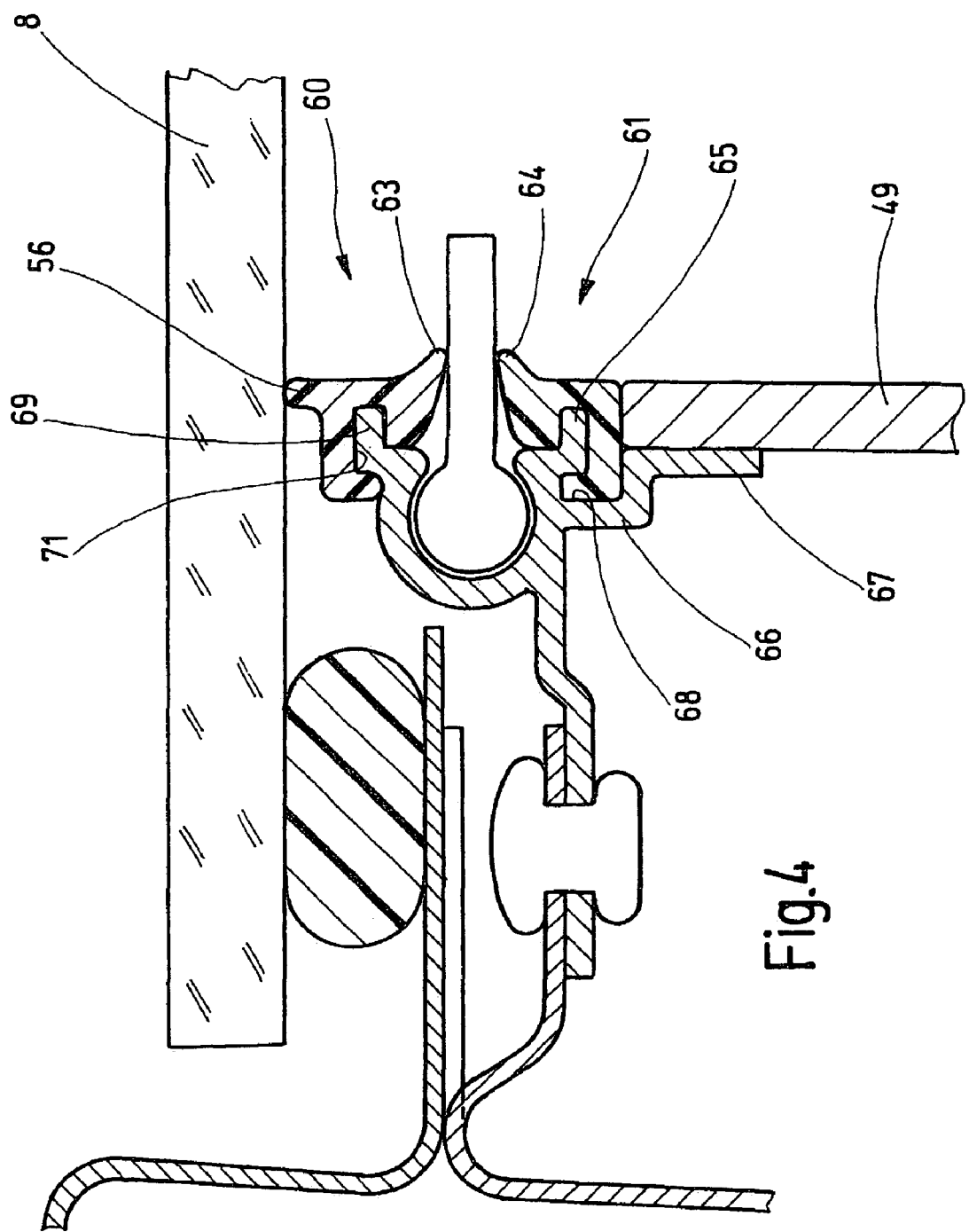
FIG. 4 is a view similar to FIG. 3 of an embodiment of the rear window shade of the invention having two lips.

A slightly modified exemplary embodiment is shown in FIG. 4, which essentially differs from the exemplary embodiment in FIG. 3 in that in place of one profiled strip with a lip 54 two profiled strips 60 and 61 are used, which cause two lips 63 and 64 to be created. To the extent that components appear in the exemplary embodiment of FIG. 4 which functionally correspond to components in the exemplary embodiment of FIG. 3, the same reference symbols are being used without again providing a detailed description.

While in the exemplary embodiment of FIG. 3 the flange 37 extends centered between the two legs 42 and 43, the flange 37 is bent at right angles in the exemplary embodiment of FIG. 4 and constitutes an extension of the leg 42. The free end of the leg 42 terminates in a strip 65 angled in an L-shape, which is used as a holding member for the elastic profiled strip 61. A leg 66, which is bent in a Z-shape and terminates in a support flange 67 for the lateral trim 49, extends from approximately the center of the guide groove 44. An L-shaped support groove 68 is created between the leg 66 and the L-shaped leg 65, which effectively secures the elastomeric profiled strip 61. The profiled strip 61 runs around the L-shaped leg 65 and into the L-shaped groove 68.

In the relaxed state, the free edge of the lip 65 extends approximately along the center of the guide groove 44.

The other leg 43 also terminates in a strip 69 angled in an L-shape onto which the profiled strip 60 with a complementary groove 71 is pushed. The profiled strip moreover constitutes the lip 56 resting against the inside of the rear window glass 9. In the relaxed state, i.e. if the shaft 58 is not at the appropriate location between the two lips 63 and 64, the two lips 63 and 64 just rest level against each other.

Freedom from rattling is also assured by the large pretensioning force exerted by the two lips 63 and 64. At the contact point with the shaft 58, the two lips 63 and 64 act as friction dampers, and the two lips 63 and 64 damp vibrations at this location.

It should finally be noted that the two elastomeric profiled strips 60 and 61, which run in the extension of the surface defined by the inside of the lateral trim 49, form a continuous surface when the lip 63 or 64 is relaxed.

As in the previous example, the guide rails 21 and the guide groove 44 are thereby covered. With the aid of the profiled strips 60 and 61, as well as the profiled strip constituting the lip 53, it is possible to continue the color of the lateral trim 49. The color of the guide rail itself is no longer important because it no longer makes an interfering appearance.

In connection with a rear window shade, elastomeric profiled strips are assigned to the guide rails in which the pull rod is guided. The profiled strips are capable of holding the respective end of the pull rod in the guide rail in an effectively rattle free manner.

What is claimed is:

1. A window shade for motor vehicles comprising:
   a winding shaft mountable within an automobile adjacent a window of the automobile, a shade web having an edge fastened to the winding shaft,
   a pull rod attached to the shade web at a location which is remote from where the shade web is connected to the winding shaft for movement with the window shade web between open and closed positions, said pull rod arrangement having an end extending laterally outwardly of said web,
   at least one guide rail for receiving said outwardly extending end of said pull rod for guiding movement of the pull rod along the guide rail, and
   at least one elastic lip mounted along the guide rail in contacting elastically deformed relation to the pull rod for biasing and maintaining the pull rod into continuous rattle-free contact with the guide rail.

2. The window shade according to claim 1 wherein the lip is formed on an elastic profiled strip.

3. The window shade according to claim 1 wherein the guide rail is undercut in such a way that it forms a guide groove extending in the longitudinal direction that is accessible from the outside through a continuous slit extending in the longitudinal direction and wherein the clearance of the slit is less than the width of the guide groove measured in the same direction.

4. The window shade according to claim 1 wherein the guide groove has a circular cross section or a square cross section.

5. The window shade according to claim 1 wherein the guide rail includes a fastening flange that extends over substantially the entire length of the guide rail.

6. The window shade according to claim 1 wherein the guide rail is made from an extruded profiled element.

7. The window shade according to claim 1 wherein the guide rail includes a holding arrangement for fastening the elastic lip in a positive manner.

8. The window shade according to claim 7 wherein the holding arrangement for fastening the elastic lip comprises an undercut groove.

9. The window shade according to claim 1 wherein the lip has a corresponding fastening arrangement for connecting the lip positively with the guide rail.

10. The window shade according to claim 1 wherein the guide rail includes a flange for receiving a portion of a lateral trim of a motor vehicle.

11. The window shade according to claim 1 wherein two lips are provided.

12. The window shade according to claim 11 wherein the two lips directly touch each other.

13. The window shade according to claim 1 wherein said pull rod is moveable in a slit in said guide rail, and said lip is configured to cover the slit while allowing movement of said pull rod along said guide rail.

14. The window shade according to claim 1 wherein the length of the pull rod arrangement can be adjusted in a telescope-like manner.

15. The window shade according to claim 1 wherein the pull rod has a guide body on at least one end that works together with the guide rail.

16. The window shade according to claim 1 wherein the guide rail is connected with the pull rod via a neck and wherein measured in the direction transverse to a longitudinal extension of the guide rail the neck has a lesser diameter than the guide body.

17. The window shade according to claim 1 wherein the guide rail has a circular or polygonal cross section.

18. The window shade according to claim 1 wherein the guide rail has larger dimensions in the longitudinal direction than in the transverse direction such that the guide body cannot be rotated with respect to the guide rail.

19. The window shade according to claim 7 wherein the holding arrangement for fastening the elastic lip comprises a strip that has a T-shaped cross section.

* * * * *